United States Patent Office 2,805,086
Patented Sept. 3, 1957

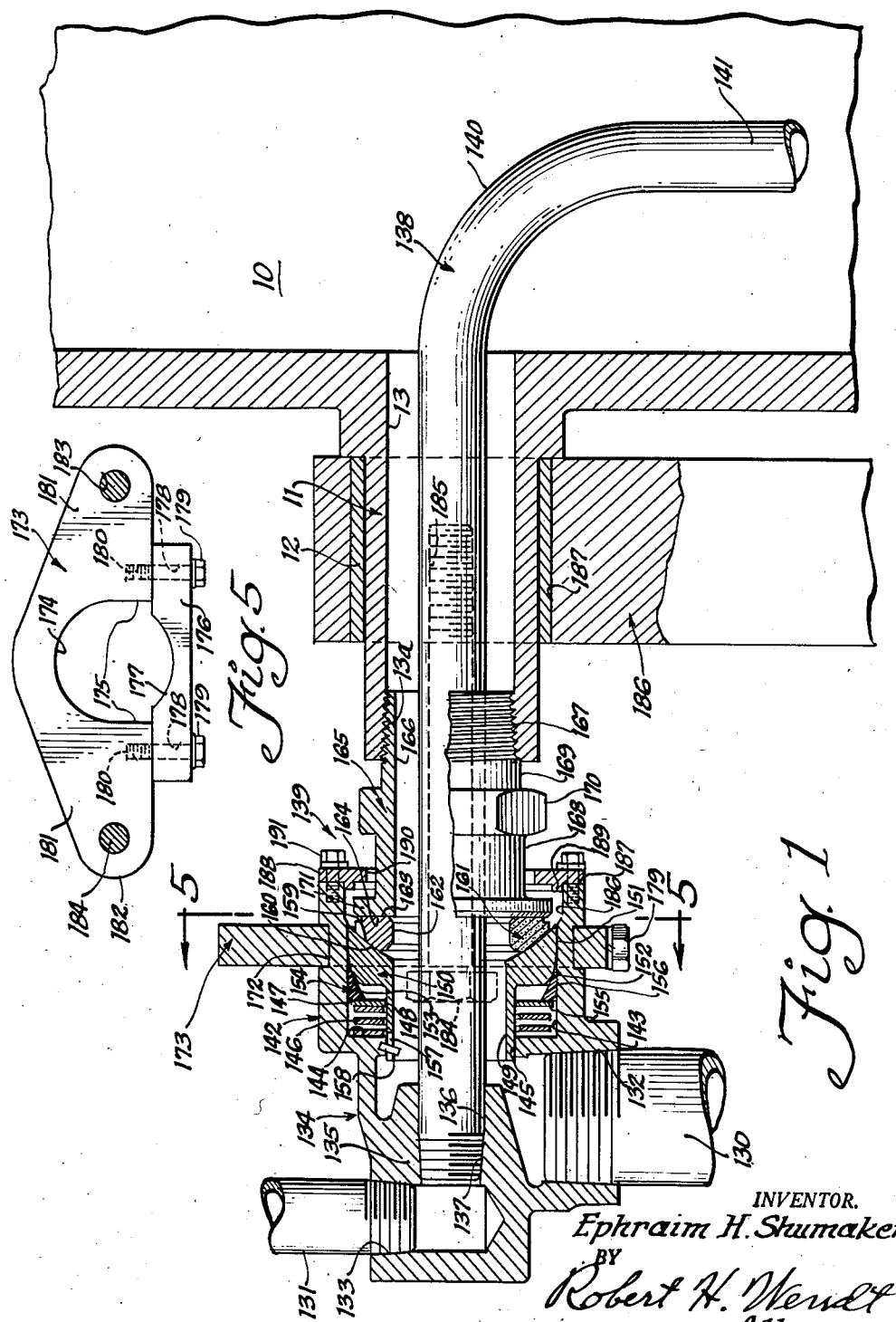

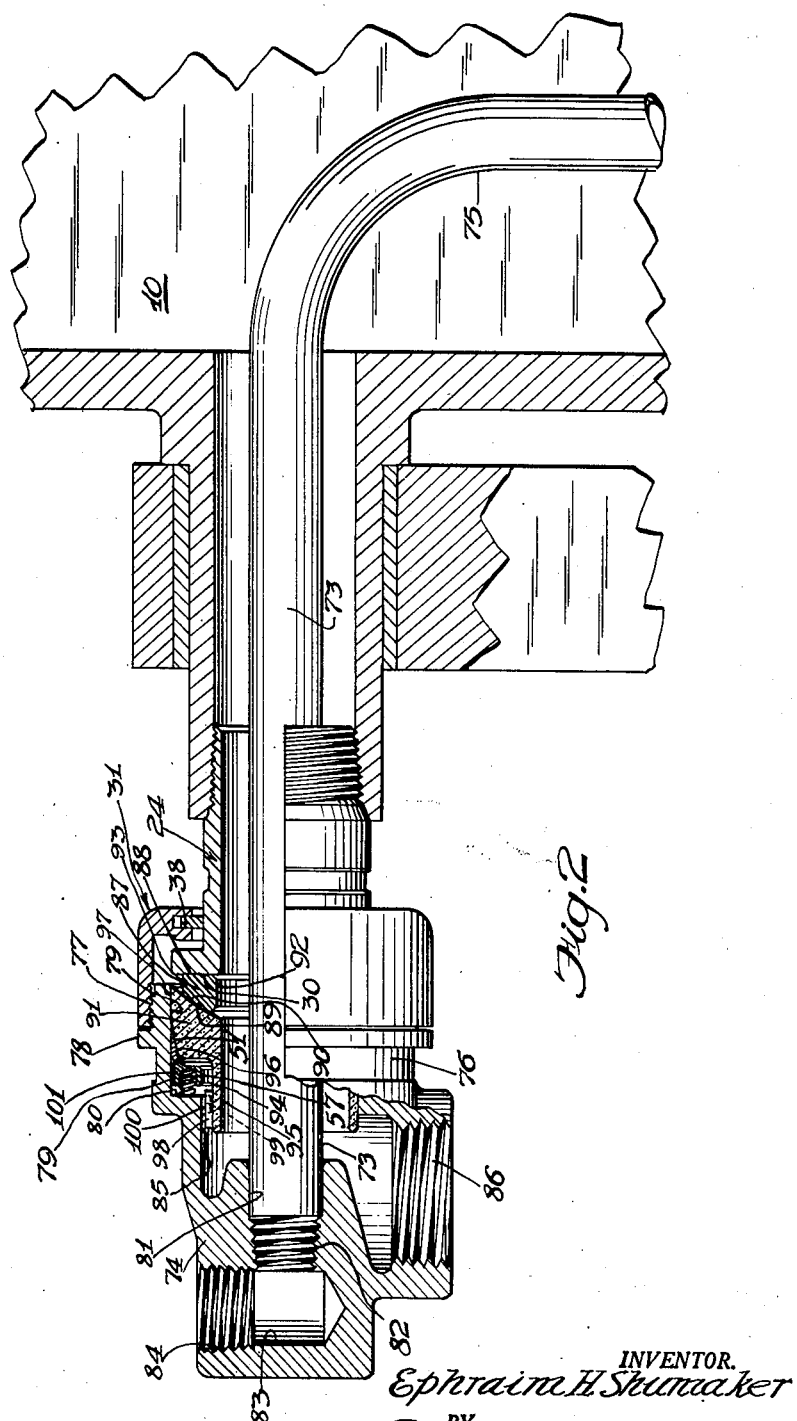

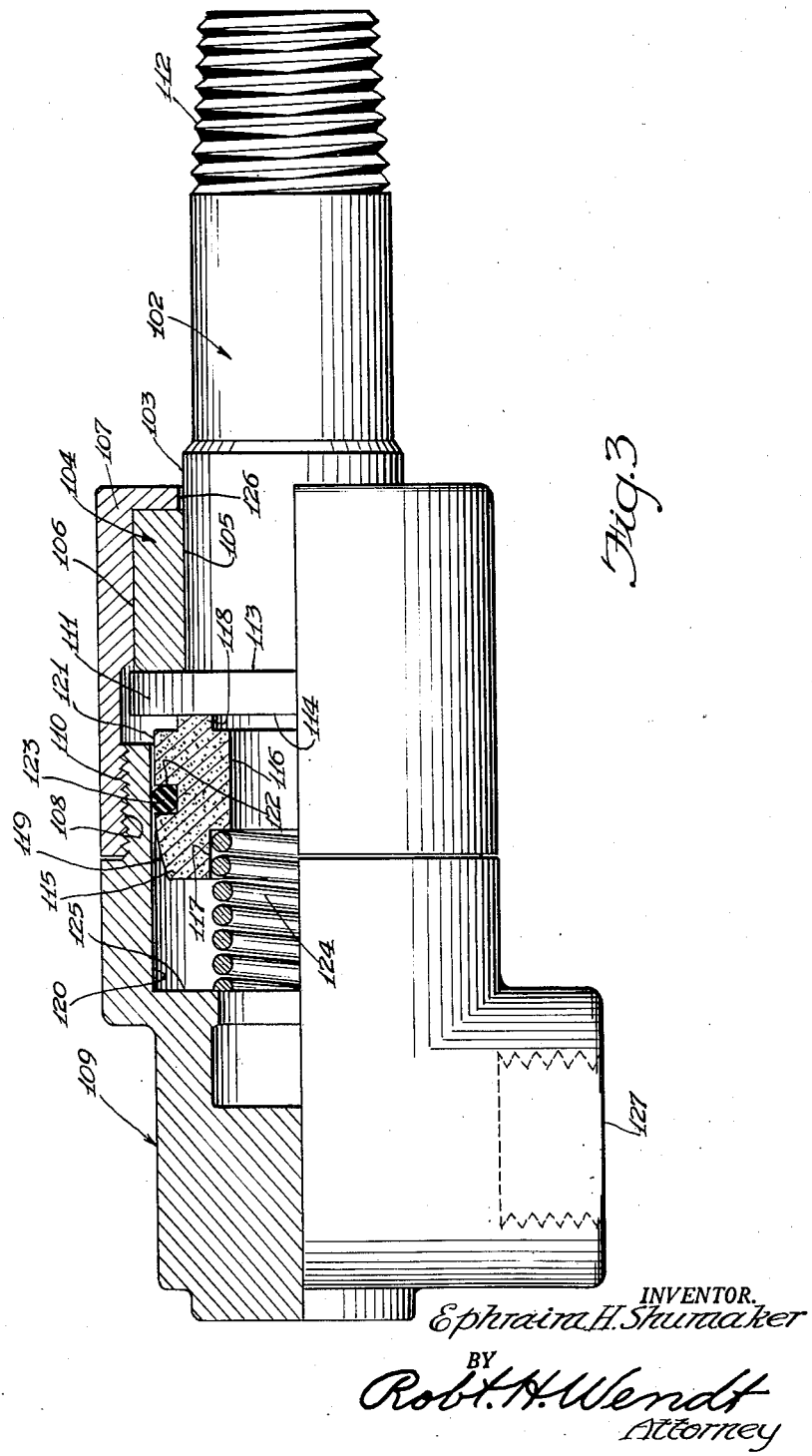

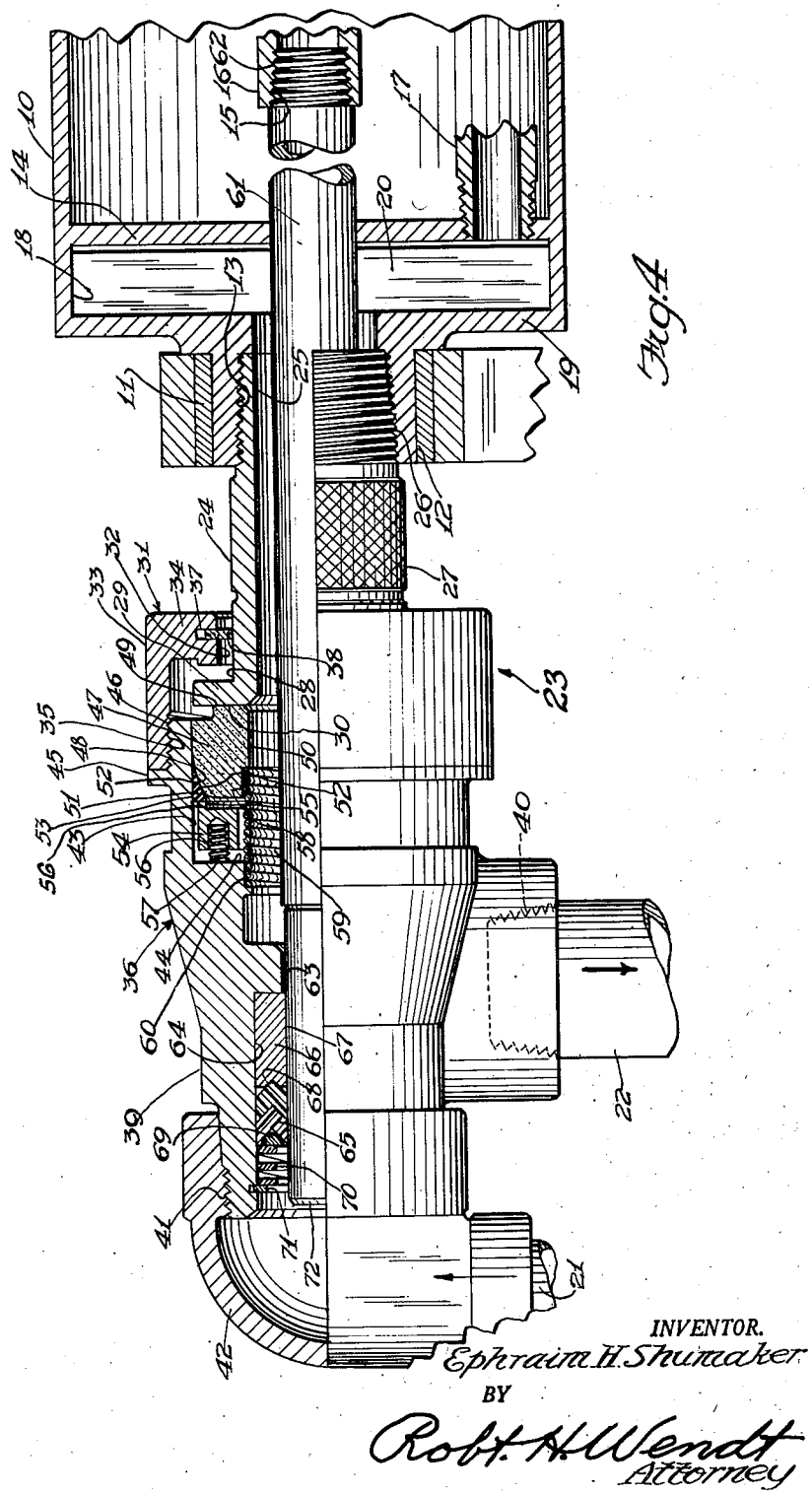

2,805,086

LIQUID-TIGHT AND GAS-TIGHT ROTATING TUBULAR JOINTS

Ephraim H. Shumaker, Sterling, Ill., assignor to Rotherm Engineering Company, Inc., Chicago, Ill., a corporation of Illinois Application October 30, 1952, Serial No. 317,692

10 Claims. (Cl. 285—134)

The present invention relates to liquid-tight and gas-tight rotating tubular joints, and is particularly concerned with an improved construction for such joints which permits a threaded fitting that is rotated with a hollow member receiving steam or the like, to be universally jointed to relatively fixed piping, while permitting such relative movement as is caused by lack of axial alignment and nonconcentricity of the parts, and which eliminates the necessity for using movable hoses between the fixed piping and the rotating parts.

In the industrial arts there are many instances in which rotating parts have to be supplied with liquid or steam; and this involves a rotating connection in the conduit leading from the boiler or other source of supply to the device in question. For example, a calendering roll may be heated with superheated steam, which is supplied by a conduit which leads through the trunnions of the calendering roll; and there may be other conduits passing through the trunnions which draw off, by suction or by siphon action, the condensed liquid.

In order to provide such a connection to a tubular conduit leading axially of the trunnion of a calendering roll, the end of the trunnion may terminate in a threaded portion which is provided with tapered threads, such as pipe threads.

When the rotating tubular joint is connected to this pipe threaded opening, it will usually be found that the fitting that goes in the pipe threaded opening is not axial; and such a fitting generally tends to wobble, and this wobbling is accentuated with the length of the fitting.

The reason for this is that the male pipe threads and the female pipe threads are not concentric to the axis of the trunnion. This comes about through the fact that pipe threads are cut with taps and dies, which taps and dies have a plurality of concentrically located teeth; but the teeth are of different sharpness, and the parts of the trunnion or pipe fitting may be of different hardness or softness on different sides. Therefore, a tap or a die tends to follow the path of least resistance; and its teeth cut in more deeply on the soft side and more shallowly on the hard side so that the resultant threads are not generally concentric and generally not axial.

Thus provision must be made in any tubular rotating joint for lack of concentricity and for a universal movement or wobbling action; and this wobbling action also causes a difference in length of the distance between the fixed pipe and the fitting which is carried by the trunnion.

One of the objects of the invention is the provision of an improved rotating liquid-tight tubular joint which permits all of these necessary movements, and which is also adapted to have its seal removed from the machine in a very short time and replaced without removing any threaded parts, thus saving the hours and minutes of stoppage which are caused when the devices of the prior art have to be repaired or replaced, since they involve the disassembly of pipe threaded members.

Another object of the invention is the provision of an improved unit connecting member which is adapted to effect a rotating liquid-tight tubular joint between a fixed pipe and a rotating pipe, even when the latter is not concentrically or axially located with respect to the former or with respect to the axis of rotation.

Another object is the provision of an improved device of the class described which is adapted to stand up under high temperatures, which operates with a minimum loss of pressure, and which may be manufactured economically, which is sturdy, simple, and efficient, and which may be provided with means for removing the condensate from the inside of the member that is being supplied with steam.

Another object of the invention is the provision of improved tubular rotating pipe joints which may be repaired and which may have their seals replaced without the necessity for removing the threaded pipe from the rotating part which is to receive steam or liquid, as the removal and reinstallation of a pipe provided with pipe threads frequently involves leakage unless the parts are rethreaded.

Other objects and advantages of the invention will be apparent from the following description and the accompanying drawings, in which similar characters of reference indicate similar parts throughout the several views.

Referring to the four sheets of drawings accompanying this specification,

Fig. 1 is a side elevational view in partial section showing a rotating tubular joint embodying the invention;

Fig. 2 is a similar view of a modification;

Fig. 3 is a similar view of another modification which is particularly adapted for hydraulic service where water, oil or other liquids are carried by the pipe.

Fig. 4 is a similar view of another modification.

Fig. 5 is a fragmentary elevational view, taken on the plane of the line 5—5 of Fig. 1, showing the yoke by means of which the joint housing is attached to a fixed support.

Referring to Fig. 1, 10 indicates a rotating hollow member, such as a calendering roll, which may be cylindrical in shape and provided with trunnions 11 at both ends and mounted for rotation upon suitable bearings 12. The heated roll has one of the trunnions, such as 11, provided with a bore 13 having internal pipe threads 13a leading to the interior of the cylinder 10.

The cylinder 10 is to be supplied with super-heated steam through a relatively fixed pipe 130; and the condensate in this case is to be removed through another relatively fixed pipe 131, both of which are threaded into bores 132 and 133 in a cast metal fixture 134.

The cast metal fixture 134 has the bores 132 and 133 extending laterally from different parts of its body, which are separated by a partition 135 having an axial bore 136 provided with a pipe threaded portion 137.

The copper siphon pipe 138 has a pipe threaded end portion, which fits in the axial bore 136 and is threaded into the threaded portion 137. Bore 136 gives the siphon pipe 138 additional support for holding it in axial position. The siphon pipe 138 projects from the fixture 134 through the rotating liquid-tight and gas-tight joint indicated at 139, and through the bore 13 of the cylinder 10, and is bent laterally at 140 with an easy bend so that its downwardly extending portion 141 may have its end tubing in the condensed water, which results from the heating of the calender roll 10 by steam and condensation; and the end of the pipe 141 is located adjacent the inner lower wall of the cylinder 10.

The fixture 134 also includes an axially projecting cylinder housing portion 142 for the rotating joint, which housing is provided with an internal cylindrical bore 143 terminating at an annular shoulder 144. The housing also has a smaller cylindrical counterbore 145.

The annular surface 144 provides a seat for a flat, helical coil spring 146, which is provided with its ends ground parallel and shaped without a feather edge to provide equal pressure against all parts of a metal thrust ring 147. Metal thrust ring 147 and spring 146 may be made of stainless steel or other suitable metal; and the thrust ring 147 has an internal bore 148 of sufficient size to pass the sleeve 149 of a follower 150.

Follower 150 has a circular body with a cylindrical outer surface 151 slidably mounted in the bore 143; and toward its left end the body of the follower 150 has a partially spherical surface 152 for engaging a complementary surface 153 on a wedge shaped seal ring 154. The wedge shaped seal ring 154 has a plane left end surface 155 engaged by the thrust ring 147; and it has an outer cylindrical surface 156 slidably mounted in the bore 143 of the housing 142.

On its inner side the surface 153 is bell shaped toward the right, being partially spherical; and thus the wedge ring 154 is shaped like a thin annular wedge. This wedge ring is preferably made of plastic material polyethyltetrafluoride, also known as tetrafluoroethylene, sold under the trade name "TEFLON"; and the wedge seal is made so thin that it possesses the characteristic of stretching or expanding when it is pressed over the partially spherical surface 152 of the follower 150. Thus the spring 146 is adapted to cause the wedge seal 154 to fit very closely in the cylindrical bore 143 and against the spherical surface 152.

This wedge ring 154 has its surfaces 153 lapped to fit against the surface 152 and also has its external cylindrical surface 156 lapped to fit in the bore 143 to provide a liquid-tight and gas-tight joint between the follower 150 and the housing 142. Follower 150 has the rearwardly extending sleeve 149, which has a sliding fit in the bore 145, and is provided with one or more end slots 157 for receiving the pressed dowel pins 158, which have a split end frictionally pressed in a bore in the wall of bore 145 to project into the slot 157 of sleeve 149.

Dowel pin 158 thus prevents the follower 150 from rotating, but permits it to slide axially. Follower 150 is preferably made of suitable metal, such as stainless steel, and is provided on its right end (Fig. 5) with a partially spherical annular surface 159, which engages a complementary convex annular spherical surface 160 on a carbon graphite seal ring 161.

The surfaces 159 and 160 are ground and lapped to provide a liquid-tight and gas-tight fit and are automatically lubricated by the graphite in the composition of which the carbon seal ring 161 is made. Seal ring 161 has a through bore 162; and its convex spherical surface 160 is of less width than the complementary surface 159 on the follower 150 so that the carbon seal ring 161 can wobble or move back and forth in a universal manner to maintain its plane end surface 163 always in liquid-tight and gas-tight sealing contact with the end surface 164 of a rotor 165.

Rotor 165 comprises a tubular metal member made of a suitable type of steel, and having a through bore 166 and a pipe threaded end portion 167 fitting the pipe threads 13a in the trunnion 11 of calender roll 10.

The rotor 165 may be externally cylindrical at 168 and 169, but preferably has a projecting noncircular part 170, which may, for example, be hexagonal for engaging a wrench. At its left end the rotor 165 has an axially outwardly projecting thrust flange 171 provided on its end with the thrust surface 164, previously mentioned.

Surface 163 on the carbon seal ring 161 and surface 164 on the rotor 165 are lapped and ground to provide a liquid-tight and gas-tight joint. The rotor 165, being imperfectly located in the trunnion 11 with regard to the axis of the trunnion 11 tends to wobble when it rotates; but the carbon seal ring 161 moves universally against the surface 159 of the follower 150 to permit this wobbling; and there is relative rotation between the surfaces 163 and 164 and also a sliding movement to accommodate this wobbling action.

The housing 142 is preferably provided with a rectangular annular groove 172 arranged at right angles to the axis of the housing and adapted to receive a flat yoke 173 (Fig. 5), which has a partially circular slot 174 for receiving the housing 142 at the groove 172.

The slot 174 has parallel sides 175 so that the yoke 173 may be slid over the housing 142; and the slot 174 is closed by means of a keeper plate 176, which may also have a partially circular slot 177 fitting the base of groove 172. Keeper plate 176 has a pair of through bores 178 for receiving screw bolts 179, which are threaded into bores 180 in the yoke.

Thus the yoke 173 is mounted on the housing 142 in substantially fixed position. Yoke 173 may be of any desired shape; but is preferably made of a flat plate tapered toward both ends 181, which are rounded at 182 and provided with through bores 183.

Headed bolts 184, one of which is seen in dotted lines in Fig. 1, extend through the bores 183 and are threaded into threaded bores 185 in the frame member 186 of the calender roll which carries the bearings 12 in bore 187.

Thus the yoke 173 may be drawn over toward the frame 186 of the calender roll; and the housing 142 may be constantly pressed in a direction so that the follower 150 is urged by spring 146 toward the right against the carbon graphite seal ring 161. By using the yoke 173 and bolts 184, one need not depend upon the pipes 130 and 131 to hold the housing 142 in position or to urge the parts together with sufficient pressure.

The housing 142 has a clearance about the thrust flange 171 on the rotor 165 by means of an enlarged counterbore 186. The housing terminates in a plane end surface 187 for a cover plate 188, which is preferably circular in shape, but split into two half parts and provided with an internal flange 189 fitting in the bore 186.

Cover plate 188 has a bore 190 extending through it, providing a clearance about the cylindrical portion 168 of the rotor, so that the rotor may wobble without hitting the cover plate. The cover plate may be secured in place with a plurality of screw bolts 191 threaded into bores in the housing 142 and provided with spring lock washers.

The operation of this type of rotating joint is as follows: The calender roll 10 rotates on its trunnions 11, which are provided with the threaded portions 13a that have been tapped by means of a pipe thread tap. It is impossible to tap such a thread in accurate axial position because the tap cuts the grooves and the parts of the tap vary in sharpness. Likewise, the parts of the trunnion bore 13 vary in hardness; and the location of the threads 13a with respect to the axis also depends on how the tap takes hold in the bore in the beginning of the threading operations.

In practically every instance the threads 13a are not axially located; and the rotor 165, which is threaded into bore 13a, is only imperfectly axial. As rotor 165 rotates, it wobbles; but there is a sliding and rotating action between the rotor and the carbon graphite seal ring 161 at the surfaces 163 and 164, which are maintained liquid-tight.

The carbon graphite seal ring 161 moves universally against the concave cylindrical surface 159 of the follower 150, which constantly presses toward the right under the influence of spring 146 to hold the carbon graphite seal ring 161 tightly against the rotor 165.

The follower 150 slides back and forth, as required, in the bore 143, and is engaged by the "Teflon" wedge ring 154, which presses into the space between the follower 150 and the bore 143 and constantly maintains a gas-tight joint between the follower and the housing 142. The follower 150 does not rotate, but merely slides back and forth axially; and the spring 146 constantly urges the wedge ring 154 and follower 150 toward the right.

The carbon graphite seal ring 161 may rotate, but is more likely to remain still against rotation because of a greater friction at the surfaces 160 and 159 than at the surfaces 163 and 164. Thus the steam may come in at the pipe 130, and passes about the siphon tube 138 in the bore 13 to the interior of the calender roll 10, which it heats, condensing to water. The water is pumped out by suction and its exit is also aided by pressure of the steam in the drum as the siphon tube dips into the condensate at the bottom of the calender roll 10.

It should be understood that arrangements may be made in which the inner tube conducts the steam to the calender roll instead of carrying away the condensate, as in Fig. 1. Thus Fig. 4 is an example of such an arrangement, in which the steam is carried by the inner tube and is a modification of the same invention.

Referring to Fig. 4, 10 indicates a rotating hollow member which may be cylindrical in shape provided with trunnions 11 at both ends and mounted for rotation upon suitable bearings 12. The heated roll 10 has one of its trunnions 11, such as the left one, provided with a bore 13 having pipe threads leading to the interior of the cylinder 10.

The cylinder 10 may have a baffle 14 spaced from the inner end of the bore 13 and provided with a threaded bore 15, also tapped with pipe threads and smaller in diameter than the bore 13.

The bore 15 may communicate with a copper tubing 16, arranged circumferentially inside the drum 10, for heating it, and terminating in a return pipe 17 which passes through the baffle 14 into the space 18.

The drum 10 may also have its end wall 19 provided with a plurality of vanes 20 which pick up the condensate inside the drum and carry it up into the bore 13, where it is discharged through the joint to a suitable system of piping.

In the foregoing example the steam pipe is attached to the internal smaller bore 15, while the condensate pipe is attached to the bore 13, but in other embodiments of the invention the inner pipe may be the condensate siphon and the outer pipe may carry the steam.

The supply of steam may be brought to the present rotating joint by means of a fixed pipe 21, while the condensate may be carried away by means of a fixed pipe 22. The present rotating tubular joint is indicated in its entirety by the numeral 23.

The joint preferably includes a rotor 24, made of a suitable type of steel and consisting of a tubular metal member, the bore of which is indicated at 25, and the right end of which is provided with external pipe threads 26, to be threaded into the bore 13 in the trunnion 11.

Rotor 24 may have a knurled surface 27 for use in threading the rotor into the trunnion 11, or the surface 27 may be noncircular. It also has an external cylindrical surface 28 and a radially extending thrust flange 29, which has an annular lapped face 30. The face 30 is also chrome plated before lapping.

The cylindrical surface 28 is surrounded by a nut 31, which may be made of malleable iron. Nut 31 has a bore 32 surrounding the cylindrical surface 28, which is larger than the cylindrical surface 28, leaving a suitable clearance for a wobbling motion or an eccentric motion of the rotor relative to the other parts.

The nut 31 has a cylindrical body 33 and an inwardly extending flange 34, which flange contains the bore 32. The cylindrical body 33 has an inner end portion threaded at 35, to be threaded on the casing 36 of the joint.

The radial flange 34 of the nut has an annular parallel sided slot 37 extending radially into this flange and adapted to receive a felt dust seal 38. This felt dust seal comprises a ring of relatively hard felt which slides in the slot 37 as the joint rotates and constantly keeps this end of the housing closed against ingress of dirt or other foreign materials.

The felt may rotate with the rotor or with the nut, but preferably rotates with the nut because of the greater surface area it has engaging in the slot 37, as compared with its inner cylindrical surface engaging the cylindrical surface 28 of the rotor.

The casing 36 of the joint comprises a cast metal member preferably of malleable iron which may be substantially cylindrical at its body portion 39, but it has a laterally projecting threaded bore 40 for the condensate pipe 22, which terminates in an end portion 41, provided with pipe threads for receiving the elbow 42 which carries steam to the joint from the fixed pipe 21.

Casing 36 is provided at its right end with a cylindrical bore 43 terminating at an annular shoulder 44. The casing 36 has a radial flange 45 at the left end of the threads 46, and the nut 31 is driven home against the flange 45.

The cylindrical bore 43 is adapted to receive the carbon-graphite molded seal ring 47. This seal ring does not rotate but it is permitted to have a universal motion in the bore 43. For this purpose the seal ring 47 has an external partially spherical surface 48, and it has a lapped end surface 49 and an internal cylindrical bore 50.

The surfaces 30 and 49 are lapped so that they have a liquid-tight and gas-tight sliding fit. The spherical surface 48 on the seal ring 47 is engaged by the wall of the bore 43 and it is also engaged by a complementary spherical surface on a wedge shaped seal 51.

This wedge shaped seal comprises a molded annular member having an inner partially spherical surface 52 engaging the outside of the ball or carbon-graphite seal ring 47. The seal 51 also has an external cylindrical surface 53 engaging in the bore 43. The seal tapers to a thin edge at the right end and has a plane end surface engaging a spring retainer 54.

This plastic seal 51 is made of the plastic material polyethyltetrafluoride, also known as tetrafluoroethylene, sold under the trade name "Teflon."

The wedge seal is made so thin that it possesses the characteristic of stretching or expanding when it is pressed over the partially spherical surface 48 of the carbon seal ring 47. The wedge seal has a lapped surface 52 engaging the carbon seal ring 47 and engaging the inside of the bore 43 to provide a liquid-tight and gas-tight joint between the carbon seal ring 47 and the casing 36.

The casing bore 43 slidably receives the spring retainer 54, which comprises an annular member of bronze substantially rectangular in cross section but provided with a rib 55 on its right face near its outer edge for engaging the left face of the wedge seal 51.

Spring retainer 54 has a multiplicity of equally spaced axially extending bores 56, each of which contains a stainless steel helical spring 57, urging the spring retainer toward the right and engaging the thrust surface 44.

The carbon seal ring 47 also has a larger counterbore 58 within which a helical closed coil spring 59 is frictionally held. The springs 57 are also frictionally held in the bores 56. The other end of the spring 59 is frictionally held in a bore 60 in the casing 36 against an inwardly projecting nose piece.

The spring 58 has a clearance with respect to the inside of the spring retainer 54 and permits a universal movement of the carbon seal ring 47 which is supported on the right end of spring 59.

The operation of this part of the joint is as follows:

The casing 36 is held in relatively fixed position by the fixed systems of piping 21 and 22. Casing 36 has an approximate axial alignment with the bore 13 in the roll 10 which is to receive steam or other fluid.

The rotor 24 is threaded into the bore 13 in an approximate alignment but is actually not concentric, nor does the rotor extend accurately in an axial direction. When the rotor rotates with the roll 10, the rotor may wobble due to the lack of its having an axial position. It may also be eccentrically revolved, and the joint permits these two motions while maintaining a fluid-tight seal as follows:

The end surface 30 of the rotor is permitted to slide on the end surface 49 of the carbon seal ring 47, and these surfaces being lapped the rotor may be eccentric and may slide back and forth across the surface 49 without permitting any leakage.

The carbon-graphite seal ring 47 is self-lubricating due to the graphite content when used against the steel lapped surface 30. As the rotor 24 rotates the lapped end surface 30 may also tilt back and forth due to the non-alignment of the axis of the rotor 24 with the axis of the trunnion 11.

As the surface 30 tilts the carbon seal ring 47 has a universal motion in the casing 36 against the "Teflon" wedge seal 51, maintaining a tight joint at the spherical surfaces. The wedge seal is also adapted to slide with its outer cylindrical surface against the inner cylindrical surface of the casing to maintain a tight joint.

The spring retainer drives the wedge seal constantly into tight sealing engagement with the interior of the casing 36 and the exterior of the carbon seal ring 47. Thus the condensate may pass out through the bore 25 and through the joint and may be discharged through the pipe 22.

The joint also includes an inner pipe 61, usually called a siphon, which has its right end provided with pipe threads 62 to be received in the threaded bore 15. The siphon pipe 61 extends through the rotor and has a suitable clearance with respect to the rotor of the carbon seal ring 47 and the spring 59, but extends through a smaller bore 63 into a counterbore 64 in the casing 36, where it is engaged by a packing assembly including V-rings 65.

These V-rings have their beveled edges slidably engaging the siphon pipe 61 which rotates inside the V-rings. The counterbore 64 contains a carbon-graphite bushing 66 which may be substantially rectangular in cross section and which is seated in the bore against an annular shoulder, and is secured by having the casing 36 heated and shrunk on the carbon bushing 66.

Carbon bushing 66 has a cylindrical bore 67 providing a bearing for the siphon pipe 61 which is self-lubricating. At its left end carbon bushing 66 has a relatively small centrally located annular V-groove 68. This V-groove engages only the apex of the V-rings, which are also preferably made of "Teflon" and which are engaged by an annular brass expander 69. This expander has a round surface engaging inside the V-rings so that the expander 69 tends to engage the lips of the V-rings to expand the V-rings.

The angularity of the two sides of the V-walls of the expander 69 is preferably different, having a 45 degree angularity on the outside and a 60 degree angularity on the inside. Thus the expander tends to press the V-rings toward the siphon pipe 61 to make a better seal.

Expander 69 is pressed toward the V-rings by a packing spring 70 of stainless steel. The packing spring is helical but preferably made of flat stock, as shown, and is engaged at its opposite end by a snap ring 71 of stainless steel which springs out into a complementary groove in the casing 36 and protrudes into the bore 64 to provide a thrust surface for the packing spring 70.

The syphon tube 61 terminates at 72 at the left end of the casing 36 and communicates with the elbow 42 which is connected to the fixed pipe 21. Steam passes in at the pipe 21 and into the siphon 61 which rotates inside the casing 36, but the V-rings 65 provide a liquid-tight and gas-tight seal about the rotating siphon pipe 61.

When it is desired to replace the carbon seal ring 47 or the "Teflon" wedge seal 51, it is only necessary to back off the nut 31, and then assuming that the pipes 21 and 22 are long enough to have some resiliency the casing 36 may be spread away from the rotor 24 sufficiently to remove the carbon seal ring between the end of the casing 36 and the end of the rotor 24. When the rotor and carbon seal ring have been spread apart, the siphon tube 61 may be removed by turning it with a wrench until its threaded end 62 is removed from the bore 15. Then the wedge seal may also be removed in a similar manner and replaced after which a new carbon seal ring can be replaced.

One of the most important advantages of the present rotating tubular joint lies in the fact that it may be repaired and its wearing parts replaced without removing the rotor 24 from the trunnion 11, because the removal of such a member which is tapped with pipe threads often causes difficulty in effecting a gas-tight seal when it is replaced unless it is rethreaded.

The present joint is self-lubricating and it may be used for a long period of time without necessity for repair or replacement of any of its parts, and it may be used for conveying superheated steam or other fluids at high temperatures which the joints of the prior art could not withstand.

Referring to Fig. 2, this is a modification showing the construction of the rotatable tubular joint when the siphon or inner tube is fixed against rotation. In such case the inner tube or siphon 73 may extend from the casing 74 through the joint into the rotatable drum 10 where it may have a depending portion 75 dipping in the condensate in the drum and permitting the condensate to be sucked up out of the drum.

The casing 74 comprises a malleable iron casing which has a substantially cylindrical part 76 at the right end terminating in a threaded portion 77, similar to that previously described. The threaded portion ends at a radial flange 78 and is adapted to receive a nut 31 similar to that previously described. The nut may have the same dust seal 38 of felt engaging a similar rotor 24, which is threaded into the end of the trunnion 11 (not shown).

The casing 74 has a cylindrical bore 79 which terminates at an annular shoulder 80. The siphon 73 is given support by a cylindrical counterbore 81 in the casing 74, and is threaded into a pipe threaded portion 82.

Bore 81 communicates with an outlet bore 83, having pipe threads 84 for a condensate outlet. The bore 79 in the casing communicates with a counterbore 85 surrounding the siphon 73, and counterbore 85 communicates with a steam inlet 86, which is also provided with pipe threads.

The casing 74 is supported in relatively fixed position by the pipes which are threaded into the casing 74 at 84 and 86. If these pipes are relatively long they possess an inherent resiliency which may permit the parts of the joint to be spread sufficiently to remove certain of the wearing parts further to be described.

The present unit includes the same lapped surface 30 on the inner end of the rotor for engaging with a floating carbon-graphite seal ring 87. This molded self-lubricating seal ring has a lapped plane surface 88 engaging the lapped surface 30 on the rotor 24, and it has a partially spherical lapped surface 89 on its opposite or left side engaging a complementary concave spherical surface 90 on the steel follower 91 which is chrome plated and ground and lapped, and free to move longitudinally in the bore 79 of casing 74.

The carbon seal ring has a central cylindrical bore 92 and an external cylindrical surface 93 which is smaller in diameter than the diameter of bore 79, so that the carbon seal ring may float laterally and may rotate with respect to either of the lapped surfaces 89 on the left or 30 on the right. Both the rotor surface 30 and the follower surface 90 are chrome plated.

The follower 91 has a tubular extension 94, provided with a cylindrical bore 95, and the tubular extension supports an enlargement which is externally partially spherical at 96. The follower has an external cylindrical surface 97 toward its right end for sliding movement in the bore 79, and the tubular extension 94 may have one or more longitudinally extending brazed lugs 98 on its outside adjacent the left end.

The lug 98 slides in a loosely fitting slot 99, formed in a circumferential rib 100 on the inside of the casing 74, and thus the follower 91 may slide back and forth from left to right but it may not rotate.

The assembly also includes the same spring retainer 101, previously described, frictionally supporting a multiplicity of stainless steel springs 57. The spring retainer 101 has the same annular rib engaging a similar "Teflon" wedge seal ring 51, like that previously described, and having an inner spherical surface.

The operation of this rotating joint is as follows:

The siphon tube 73 being fixed with respect to the pipes supporting the casing 74, it needs no seal, and it extends through the joint into the drum which is to receive steam or other fluids.

The rotor 24 rotates with the drum while the follower 91 slides but cannot rotate due to the key 98. The carbon-graphite seal ring 87 floats and moves universally on the spherical surface 90 and is self-aligning, depending upon the angularity, at any moment, of the end surface 30 of the rotor 24.

Rotation may take place between surfaces 89 and 90 and also between surfaces 88 and 30, or solely at either pairs of these surfaces.

The rotor 24 may move eccentrically and this is permitted by sliding movement at the surfaces 30 and 88. Rotor 24 may wobble out of alignment and this is permitted at the partially spherical surfaces 89 and 90, while still maintaining a seal at the surfaces 30 and 88.

The "Teflon" wedge seal 51 maintains a tight seal between the follower 91 and the casing 84, and is adapted to stretch resiliently as it is pressed over the ball surface 96 to maintain a self-lubricating tight seal.

Referring to Fig. 3, this is a modification which is useful for hydraulic surfaces in which water or oil are conducted through a rotating tubular joint at temperatures up to about 250 degrees F. This joint includes a steel rotor 102, which has an outer cylindrical surface 103, rotatably mounted in a carbon-graphite bearing 104.

The carbon-graphite bearing 104 is substantially rectangular in cross section and has a cylindrical bore 105 and an externally cylindrical surface 106. The carbon-graphite bearing 104 is frictionally held in a complementary bore in the nut 107, which is threaded at 108, to be threadedly secured on the casing 109 at 110.

Carbon bearing 104 is secured in the nut by having the nut heated and shrunk on the bearing and it acts as a radial and thrust bearing for the rotor 102. Rotor 102 has the radially extending flange 111 and a pipe threaded end 112. Flange 111 has a thrust surface 113 engaging the carbon bearing 104, and also has a chrome plated and lapped end surface 114 for engagement with a carbon-graphite seal ring 115.

The carbon-graphite seal ring 115 is self-lubricating and has an internal cylindrical bore 116 and a larger counterbore 117. The carbon seal ring has at its right end a projecting nose piece with a lapped surface 118 engaging the lapped surface 114 on the rotor.

The carbon seal ring has an external tapered surface 119, permitting a limited universal motion inside the casing 109, which has a cylindrical bore 120. Toward the right end the external surface of the carbon seal ring 115 at 121 is substantially cylindrical.

The carbon seal ring 115 has an annular groove 122 surrounding its periphery; and this groove is substantially rectangular in cross-sectional shape and contains an O-ring 123 of synthetic rubber. The O-ring is tensioned about the base of the groove 122; and while normally circular in cross section, it is compressed to oval shape by engagement with the walls of the cylindrical bore 120.

When subjected to pressure from the right side, the O-ring provides a seal on three sides, which are, respectively, the top, the bottom and the left side of the O-ring; and these points of engagement may be varied according to the movement of the carbon seal ring 115 which contains the O-ring.

The carbon seal ring 115 is urged toward the right and is prevented from rotating by the friction of the O-ring against the inside of the bore 120. It is urged to the right by a closed helical compression spring 124 which engages an annular shoulder 125 in the casing 109, and which is frictionally held in the counterbore 117 by being pressed into the bore. Thus the compression spring, O-ring, and graphite seal ring may be removed as a unit and replaced.

The rotor flange 111 has a clearance with respect to the inside of the nut 107, and the nut has an inwardly extending radial flange 126 surrounding the rotor 102, which has a clearance.

The present rotating tubular joint operates as follows:

The casing 109 is supported by a pipe which is threaded into its inlet 127 and the rotor 102 has its threaded end 112 threaded into the trunnion of a rotating member, such as the trunnion 11.

The rotor 102 rotates while the casing 109, nut 107 and bearing 104 are held against rotation. Spring 124 constantly urges the carbon seal ring 115 against the end of the rotor 102, maintaining a tight, self-lubricating seal with the rotating rotor, but the carbon ring does not rotate.

The carbon ring may move back and forth in the casing 109, and a fluid-tight seal is maintained between the carbon ring 115 and the casing 109 by the O-ring 114. When it is desired to replace any of the parts which are subject to wear, such as the carbon ring or the O-ring, it is only necessary to back off the nut 107.

The pipes which are connected to the casing 109 at 127 may have sufficient resiliency to permit the casing 109 to be spread away from the flange 111 of the rotor 102 sufficiently so that the carbon seal ring 115, with the O-ring 122 and the spring 124, may be removed as a unit and quickly replaced. It is never necessary to remove the pipe threaded rotor 102 from the drum when repairing the wearing parts of the joint.

It will thus be observed that I have invented a plurality of types of tubular rotating joints which are adapted to maintain a liquid-tight and gas-tight seal while permitting a relative eccentric movement or wobbling movement of the pipe connections at both ends of the joint.

The wearing parts of these joints may be quickly removed and replaced by merely backing off a nut which encloses the parts and by spreading the parts of the joint sufficiently to take out the sealing rings and other associated parts which form a unit.

The present joints are self-lubricating and are adapted to withstand high temperatures and may be used for a long period of time under the most adverse conditions without necessity for repair or replacement of parts.

A minimum amount of time is lost when repairing or replacing such joints and thus machinery is kept operating with a minimum loss of time.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States is:

1. A liquid and gas tight rotating tubular joint for conveying steam to a rotating member comprising, a tubular rotor having at one end means for securing it to said rotating member, said rotor being provided at its opposite end with a plane end thrust surface, a housing for said joint comprising a metal member provided with a connection means for receiving a pipe for conveying steam into said housing, the said housing having an axially extending bore located in imperfect axial alignment with said rotor, a carbon graphite sealing ring having a plane surface engaging the plane surface of said rotor for sliding and rotating movement, said carbon sealing ring having an oppositely located convexly curved, partially spherical annular surface, and having a clearance in said housing bore and a through bore communicating with the interior of said rotor, a metal follower member having an annular body with an external cylindrical surface slidably mounted in said housing bore and provided on the side toward said carbon sealing ring with a complementary concave, partially spherical annular surface engaging said carbon sealing ring, and having a greater width than the width of the opposed surface on said sealing ring, and spring means engaging an annular shoulder in said housing and urging said follower against said carbon sealing ring, the follower sliding but not rotating, and the rotor having sliding and rotating engagement with said carbon sealing ring to maintain a liquid tight joint, the said follower being provided with a tubular sleeve extending through said spring means and slidably engaging a counterbore in said housing, and means in said counterbore for preventing rotation of said follower.

2. A liquid and gas tight rotating tubular joint for conveying steam to a rotating member comprising, a tubular threaded rotor having at one end threads for securing it to said rotating member, said rotor being provided at its opposite end with a plane end thrust surface, a housing for said joint comprising a metal member provided with a threaded bore for receiving a pipe for conveying steam into said housing, the said housing having an axially extending bore located in imperfect axial alignment with said rotor, a carbon graphite sealing ring having a plane surface engaging the plane surface of said rotor for sliding and rotating movement, said carbon sealing ring having an oppositely located convexly curved, partially spherical annular surface, and having a clearance in said housing bore and a through bore communicating with the interior of said rotor, a metal follower member having an annular body with an external cylindrical surface slidably mounted in said housing bore and provided on the side toward said carbon sealing ring with a complementary concave, partially spherical annular surface engaging said carbon sealing ring, and having a greater width than the width of the opposed surface on said sealing ring, and spring means engaging an annular shoulder in said housing and urging said follower against said carbon sealing ring, means carried by the housing and projecting into a longitudinal slot in said follower to permit sliding but not rotation of said follower, and the rotor having sliding and rotating engagement with said carbon sealing ring to maintain a liquid tight joint, the said follower being provided on its outer rear corner opposite to said sealing ring with a convex, partially spherical surface, forming a tapered annular groove in connection with the wall of said housing bore, and a resilient, thin, wedge-shaped sealing ring having a sharply tapered edge engaged in said wedge-shaped groove between said housing wall and said follower and engaged by said spring means to urge the wedge seal into said groove.

3. A liquid and gas tight rotating tubular joint for conveying steam to a rotating member comprising, a tubular threaded rotor having at one end threads for securing it to said rotating member, said rotor being provided at its opposite end with a plane end thrust surface, a housing for said joint comprising a metal member provided with a threaded bore for receiving a pipe for conveying steam into said housing, the said housing having an axially extending bore located in imperfect axial alignment with said rotor, a carbon graphite sealing ring having a plane surface engaging the plane surface of said rotor for sliding and rotating movement, said carbon sealing ring having an oppositely located convexly curved, partially spherical annular surface, and having a clearance in said housing bore and a through bore communicating with the interior of said rotor, a metal follower member having an annular body with an external cylindrical surface slidably mounted in said housing bore and provided on the side toward said carbon sealing ring with a complementary concave, partially spherical annular surface engaging said carbon sealing ring, and having a greater width than the width of the opposed surface on said sealing ring, and spring means engaging an annular shoulder in said housing and urging said follower against said carbon sealing ring, the follower sliding but not rotating, and the rotor having sliding and rotating engagement with said carbon sealing ring to maintain a liquid tight joint, the said follower being provided on its outer rear corner opposite to said sealing ring with a convex, partially spherical surface, forming a tapered annular groove in connection with the wall of said housing bore, and a resilient, thin, wedge-shaped sealing ring having a sharply tapered edge engaged in said wedge-shaped groove between said housing wall and said follower and engaged by said spring means to urge the wedge seal into said groove, and a yoke carried by said housing and threaded means engaging said yoke for urging said housing toward said rotor to maintain a constant spring pressure against the wedge seal follower and carbon ring against the rotor.

4. A rotating liquid tight and gas tight joint assembly comprising, a support provided with bearings, a steam heated rotating member rotatably mounted in said bearings, and having a hollow trunnion provided with a bore, said bore being provided with pipe connection means at its end, a rotor secured to said pipe connection means and extending in imperfect axial alignment with said trunnion, said rotor having a bore and an end thrust surface, and wobbling as said trunnion rotates, a steam pipe fitting provided with a bore for receiving a steam supply pipe, and having a joint housing with a bore extending substantially axially with respect to said trunnion, a follower comprising an annular metal member having an outer cylindrical wall slidably mounted in said housing bore and provided with a partially spherical, concave annular surface toward said rotor, a carbon graphite sealing ring interposed between said follower and said end thrust surface of said rotor, said carbon sealing ring having a convex, partially spherical, annular surface engaging the follower and having a plane thrust surface engaging the thrust surface on said rotor, and spring means for urging said follower into engagement with the carbon sealing ring and for urging said carbon seal into engagement with said rotor to maintain a liquid tight and gas tight joint, while permitting relative rotation and wobbling between the follower and the rotor, the said follower being provided on its outer corner adjacent the housing bore and opposite to said rotor with a convex, partially spherical surface forming a thin wedge-shaped groove in connection with a wall of said housing, and a non-metallic, flexible resilient, thin wedge-shaped annular sealing member engaged by said spring means and urged into said wedge-shaped groove to establish a liquid tight seal between the housing and the follower.

5. A rotating liquid tight and gas tight joint assembly comprising, a support provided with bearings, a steam heated rotating member rotatably mounted in said bearings, and having a hollow trunnion provided with a bore, said bore being provided with internal pipe threads at its end, a rotor threaded into said pipe threads and extending in imperfect axial alignment with said trunnion, said rotor having a bore and an end thrust surface, and wobbling as said trunnion rotates, a steam pipe fitting provided with a bore for receiving a steam supply pipe, and having a joint housing with a bore extending substantially axially with respect to said trunnion, a follower comprising an annular metal member having an outer cylindrical wall slidably mounted in said housing bore and provided with a partially spherical, concave annular surface toward said rotor, a carbon graphite sealing ring interposed between said follower and said end thrust surface of said rotor, said carbon sealing ring having a convex, partially spherical, annular surface engaging the follower and having a plane thrust surface engaging the thrust surface on said rotor, and spring means for urging said follower into engagement with the carbon sealing ring and for urging said carbon seal into engagement with said rotor to maintain a liquid tight and gas tight joint, while permitting relative rotation and wobbling between the follower and the rotor, the said follower being provided on its outer corner adjacent the housing bore and opposite to said rotor with a convex, partially spherical surface forming a thin wedge-shaped groove in connection with a wall of said housing, and a non-metallic, flexible, resilient, thin wedge-shaped annular sealing member engaged by said spring means and urged into said wedge-shaped groove to establish a liquid tight seal between the housing and the follower, and means carried by said housing and follower for permitting the sliding movement of the follower in the housing, but preventing relative rotation between the housing and follower.

6. A rotating liquid tight and gas tight joint assembly comprising, a support provided with bearings, a steam heated rotating member rotatably mounted in said bearings, and having a hollow trunnion provided with a bore, said bore being provided with internal pipe threads at its end, a rotor threaded into said pipe threads and extending in imperfect axial alignment with said trunnion, said rotor having a bore and an end thrust surface, and wobbling as said trunnion rotates, a steam pipe fitting provided with a bore for receiving a steam supply pipe, and having a joint housing with a bore extending substantially axially with respect to said trunnion, a follower comprising an annular metal member having an outer cylindrical wall slidably mounted in said housing bore and provided with a partially spherical, concave annular surface toward said rotor, a carbon graphite sealing ring interposed between said follower and said end thrust surface of said rotor, said carbon sealing ring having a convex, partially spherical, annular surface engaging the follower and having a plane thrust surface engaging the thrust surface on said rotor, and spring means for urging said follower into engagement with the carbon sealing ring and for urging said carbon seal into engagement with said rotor to maintain a liquid tight and gas tight joint, while permitting relative rotation and wobbling between the follower and the rotor, the said follower being provided on its outer corner adjacent the housing bore and opposite to said rotor with a convex, partially spherical surface forming a thin wedge-shaped groove in connection with a wall of said housing, and a non-metallic, flexible, resilient, thin wedge-shaped annular sealing member engaged by said spring means and urged into said wedge-shaped groove to establish a liquid tight seal between the housing and the follower, and means carried by said housing and follower for permitting the sliding movement of the follower in the housing, but preventing relative rotation between the housing and follower, and a yoke carried by said housing and provided with threaded means secured to the support for the bearings of said rotatable member for constantly drawing and holding the housing in adjusted position with respect to said rotor to maintain a predetermined spring pressure against the follower, wedging ring and carbon seal ring against the rotor.

7. A liquid-tight and gas-tight rotating tubular joint, comprising a casing provided with a pipe threaded fluid inlet for receiving a supporting pipe in relatively fixed position, a rotor comprising a tubular member having a pipe threaded end portion to be secured in a rotating member which is to receive the fluid, said rotor having a plane thrust surface at its inner end, said casing having a cylindrical bore, in general but not accurate axial alignment with said rotor, a carbon graphite seal ring engaging the end thrust surface of said rotor, and having a plane surface toward said rotor, said carbon ring having a partially spherical convex surface on its opposite side, a follower having sliding engagement with the bore in said casing, and having a complementary annular, concave, partially spherical surface engaging said carbon ring, sealing means between said follower and the internal wall of said bore in said casing, and resilient means engaging said casing and urging said sealing means and follower toward said carbon seal ring to permit a limited eccentric motion of said rotor and a limited wobbling motion of said rotor relative to said casing by the universal movement of said carbon ring relative to said follower and the sliding motion of said carbon ring relative to said rotor, said latter sealing means comprising an annular resilient, thinly tapered ring of tetrafluoroethylene wedged between said follower and the interior cylindrical wall of said casing.

8. In a liquid-tight and gas-tight rotating tubular joint for conveying steam to a rotating member comprising, a fixed bearing supporting member, a bearing, a hollow trunnion for said member rotatably mounted in said bearing and having a threaded bore, a nipple having a threaded end in said bore and having a through bore provided with a head having a plane thrust surface on the other end of said nipple, a pipe and a housing carried thereby, said housing having a cylindrical counterbore surrounding said head and roughly coaxially located with respect to said nipple, a metal piston member slidably mounted in said counterbore and having a through bore, a compression spring between said piston and an annular shoulder in said housing, said piston being non-rotatably mounted in said housing and having a tapered outer surface toward said spring, defining a tapered annular groove with the wall of said counterbore, a non-metallic annular wedge sealing member in said groove and formed substantially complementarily to said groove, said seal having an annular thrust surface toward said spring, said piston having a partially spherical, concave annular surface at its end opposite to said thrust surface on said nipple, and an annular floating ring of rigid carbon graphite composition having a through bore and having a plane end surface sliding on the plane thrust surface on the end of said nipple, and having a partially spherical convex annular surface at its opposite end in said piston concave annular surface, and sliding and rotating with limited universal movement as the plane end of said ring follows the plane end of said nipple during rotation of said nipple, said spring driving said wedge seal and therewith said piston, into engagement with said ring, and driving said ring against said nipple to maintain a fluid-tight joint.

9. In a liquid-tight and gas-tight rotating tubular joint for conveying steam to a rotating member comprising, a fixed bearing supporting member, a bearing, a hollow trunnion for said member rotatably mounted in said bearing and having a threaded bore, a nipple having a threaded end in said bore and having a through bore provided with a head having a plane thrust surface on the other end of said nipple, a pipe and a housing carried thereby, said housing having a cylindrical counterbore surrounding said head and roughly coaxially located with respect to said nipple, a metal piston member slidably mounted in said counterbore and having a through bore, a compression spring between said piston and an annular shoulder in said housing, said piston being non-rotatably mounted in said housing and having a tapered outer surface toward said spring, defining a tapered annular groove with the wall of said counterbore, a non-metallic annular wedge sealing member in said groove and formed substantially complementarily to said groove, said seal having an annular thrust surface toward said spring, said piston having a partially spherical, concave annular surface at its end opposite to said thrust surface on said nipple, and an annular floating ring of rigid carbon graphite composition having a through bore and having a plane end surface sliding on the plane thrust surface on the end of said nipple, and having a partially spherical convex, annular surface at its opposite end in said piston concave annular surface, and sliding and rotating with limited universal movement as the plane end of said ring follows the plane end of said nipple during rotation of said nipple, said spring driving said wedge seal and therewith said piston, into engagement with said ring, and driving said ring against said nipple to maintain a fluid-tight joint, said piston having a tubular portion extending from said piston in said spring and slidably mounted in a smaller bore in said housing.

10. In a liquid-tight and gas-tight rotating tubular joint for conveying steam to a rotating member comprising, a fixed bearing supporting member, a bearing, a hollow trunnion for said member rotatably mounted in said bearing and having a threaded bore, a nipple having a threaded end in said bore and having a through bore provided with a head having a plane thrust surface on the other end of said nipple, a pipe and a housing carried thereby, said housing having a cylindrical counterbore surrounding said head and roughly coaxially located with respect to said nipple, a metal piston member slidably mounted in said counterbore and having a through bore, a compression spring between said piston and an annular shoulder in said housing, said piston being non-rotatably mounted in said housing and having a tapered outer surface toward said spring, defining a tapered annular groove with the wall of said counterbore, a non-metallic annular wedge sealing member in said groove and formed substantially complementarily to said groove, said seal having an annular thrust surface toward said spring, said piston having a partially spherical, concave annular surface at its end opposite to said thrust surface on said nipple, and an annular floating ring of rigid carbon graphite composition having a through bore and having a plane end surface sliding on the plane thrust surface on the end of said nipple, and having a partially spherical convex, annular surface at its opposite end in said piston concave annular surface, and sliding and rotating with limited universal movement as the plane end of said ring follows the plane end of said nipple during rotation of said nipple, said spring driving said wedge seal and therewith said piston, into engagement with said ring, and driving said ring against said nipple to maintain a fluid-tight joint, said piston having a tubular portion extending from said piston in said spring and slidably mounted in a smaller bore in said housing, said tubular portion having a longitudinally extending slot adjacent said smaller bore, and said housing having a fixed pin projecting into said slot, preventing rotation of said piston relative to said housing.

References Cited in the file of this patent

UNITED STATES PATENTS

| Re. 23,298 | Monroe | Nov. 28, 1950 |
| 1,529,994 | Ellis | Mar. 17, 1925 |
| 1,639,800 | Gillick | Aug. 23, 1927 |
| 1,896,062 | Berry | Feb. 7, 1933 |
| 2,366,541 | Malkin | Jan. 2, 1945 |
| 2,384,281 | Carter | Sept. 4, 1945 |
| 2,408,314 | Jacobsen | Sept. 24, 1946 |
| 2,437,004 | Rutledge | Mar. 2, 1948 |
| 2,462,006 | Schmitter | Feb. 15, 1949 |
| 2,467,312 | Jack | Apr. 12, 1949 |
| 2,496,471 | Hornbostel | Feb. 7, 1950 |
| 2,634,990 | Fink | Apr. 14, 1953 |
| 2,665,145 | Shumaker | Jan. 5, 1954 |
| 2,670,973 | Ginther | Mar. 2, 1954 |